Jan. 11, 1927.

C. BENDTSEN 1,614,340

AUTOMOBILE HORN BLOWER

Filed Jan. 2, 1926

INVENTOR.
CARL BENDTSEN.
BY
Richard Owen
ATTORNEY.

Patented Jan. 11, 1927.

1,614,340

UNITED STATES PATENT OFFICE.

CARL BENDTSEN, OF BROOKLYN, NEW YORK.

AUTOMOBILE HORN BLOWER.

Application filed January 2, 1926. Serial No. 78,955.

This invention relates to horn blowing devices and in one particularly adapted for use in conjunction with the steering wheel of an automobile.

A particular object of the invention is to arrange a horn blowing device positioned to be operated by the person driving an automobile without the necessity of the driver removing his hands from the steering wheel.

A further object of the invention is to provide a device so arranged that it will be contiguous to the periphery of an automobile wheel and at the same time will not be in the way of an operator's movements in guiding the automobile or controlling the same when the levers for this purpose are manipulated.

A further object of the invention is to provide a device of this character which can be readily attached to the steering post housing without removing any of the parts of the wheel or the controlling levers contained therein.

Figure 1:
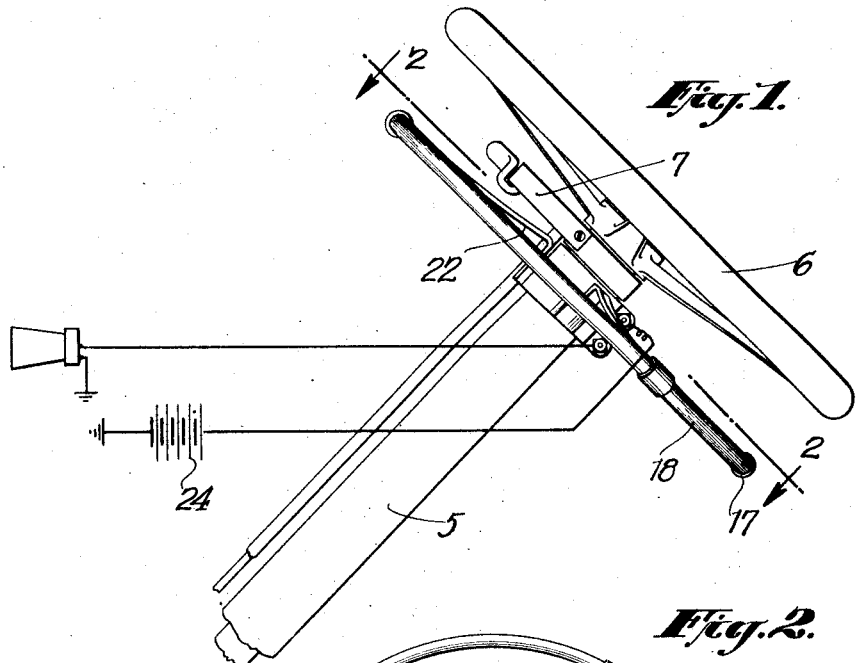

To enable others skilled in the art to fully comprehend the underlying features of my invention that they may embody the same in the various modifications in structure and relation contemplated, drawings depicting a preferred form have been annexed as a part of this disclosure and in which, similar reference characters denote corresponding parts throughout all of the views, of which, Figure 1 is a side view in elevation of an automobile steering wheel and column having attached thereto my improved horn blowing device.

Figure 2:
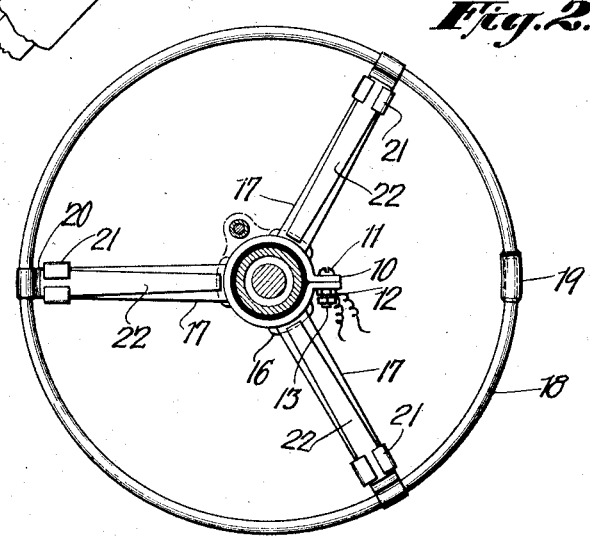
Figure 3:
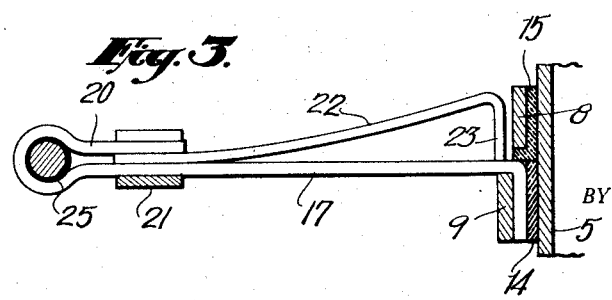

Figure 2 is a cross sectional view taken on the line 2—2 of Figure 1, and shows the arrangement of the parts of the device relatively to the steering post, and Figure 3 is an enlarged view in section showing the arrangement of the radial arms and contact fingers which go to make up the device.

Referring to the drawings in detail, 5 indicates a steering post having at its upper end the usual wheel 6 and lever arrangement 7. It is usual in automobile construction to have a button either at the center of the wheel or on the post below the wheel. In either of these positions, it is necessary for the operator of the machine to remove one hand from the wheel in order to sound the horn. My device overcomes this objectionable feature by making it unnecessary for the operator to remove his hand from the steering wheel and in order to carry out my invention, I provide a plurality of snap collars 8 and 9, having formed thereon the ears 10 through which pass the bolts 11 upon which are threaded the clamping nuts 12 and the wire holding nuts 13, it being understood that a wire extends from each of the collars 8 and 9 to form the connection between the horn, the battery and the horn sounding device. The collars 8 and 9 are suitably insulated from the steering post 5 through the medium of the insulating rings 14 and 15, the upper ring 15 being flanged in its lower portion to provide a seat for the collar 8 and to also insulate said collar 8 from the collar 9, it being understood that the collars 8 and 9 are two different units and, while they may be spaced apart slightly, are only separated by the thickness of the insulating ring 15, normally. The lower snap collar 9 is extended as at 16 to provide a seat for the turned down end of the radial arm 17 of which there may be any number but I find that three give very satisfactory results.

The radial arm at its outer end is formed to provide a clamp in which is held the ring member 18. This member, being either formed of solid metal and having one end expanded as at 19 to form a socket for the opposite end of the ring, or the entire ring can be made of tubing, as desired, it being understood that the ring 18 is a snap ring and is so tempered that the meeting ends thereof will remain normally closed. The radial arm, in that portion inwardly of the ring and indicated as at 20, is engaged by a strap 21, which passes around the radial arm and holds securely therebetween, the end of a contact finger 22, the inner end of which is provided with a downward projecting portion 23 which normally rests on the radial arm in slightly spaced relation with the collar member 8. The contact finger 22 and the radial arm 17 are made of resilient metal as is the ring member 18. It is evident therefore that when the collars 8 and 9 are secured to the steering post column 5 and the ring member 18 is drawn upon by the ends of the fingers of the operator, that the radial arm 17 nearest that portion of the ring 18 which is drawn upon, will be bent up and will cause the downwardly projecting portion 23 of the contact finger 22 to come into contact with the upper collar 8, thereby making contact between said collar 8 and the collar 9 through the medium of said downwardly projecting portion 23 and the radial arm 17. This will occur in any one of the arms when the ring 18, is drawn upon, it being of course understood that when the hands of the operator are engaging the wheel 6, the finger of one hand can be used to engage and draw upon the ring 18 to close the contact and thereby blow the horn, which, as shown in diagrammatic outline in Figure 1, is electrically connected through the battery 24 and the collars 8 and 9. In Figure 3 it will be noted that I have provided radial arms with an insulating collar or band 25 which fits over the ring 18 in that portion which is engaged and held by the outer end of the radial arm 17.

It will be noted that the collars 8 and 9, when the bolts 11 are removed, can be snapped in position around the steering post 5 and the ring 18 can be broken at its point of separation to be placed around the steering post 5 together with the collars 8 and 9. If it is desired, the strap members 21 can be so shaped that they will frictionally hold the contact fingers 22 in position on the radial arms 17 and in this instance, the entire device can be disassembled by slipping the strap 21 inwardly along the radial arms until the contact fingers can be removed. This friction of the strap 21 will afford also an adjustment of the contact finger 22 relatively to the collar 8 so that it will be necessary to either draw up on the rings 18 slightly or else a greater raising movement of the said rings will be necessary before contact is made between the collars 8 and 9 and the horn thereby sounded. It will be evident therefore that I have provided an improved horn sounding device which can be applied to automobiles without taking up any space, without redesign of the parts and without extraordinary manipulation on the part of the person applying the device to the steering post of an automobile.

It will also be evident that I have provided a horn blowing device which will not necessitate removal of the hands of the operator from the steering wheel, thereby avoiding accident, which is often the case when one of the hands of the operator has to be removed from the wheel in order to sound the horn.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit of the invention or the scope of the appended claims.

Having thus described my invention, what I claim as new and desire to secure by United States Letters Patent is:—

1. An electric circuit completing device for use with vehicle horns comprising a plurality of collars in circuit with the horn but normally maintaining a break in the circuit, a yieldable ring supported by one of said collars, radial arms having an end bent about said ring connecting the collar and the ring, a contact finger on each arm held between the bent end of said arm and the arm, the end of the contact finger being positioned to engage the other collar when an adjacent portion of the ring is raised, and a strap for removably holding the contact finger between the portions of the radial arm.

2. The combination with a vehicle steering wheel post, of a plurality of collars detachably secured to said post, insulating agents between the post and the collars, one of said insulating agents being adapted to break an electric horn operating circuit, of which the collars form a part, a separable ring held by one of the collars in a position contiguous to the periphery of a steering wheel, resilient arms connecting the collar and the ring, resilient fingers on said arms, the ends of which are provided with vertically disposed portions forming contacts adapted to engage the other of said collars, said arms being so arranged that a movement of any portion of said ring toward the steering wheel will cause the circuit between the collars to be completed and the horn sounded, and straps for adjustably holding the fingers and the arms together whereby said fingers can be moved toward or away from said collar.

In testimony whereof, I affix my signature.

CARL BENDTSEN. [L. S.]